Patented Jan. 4, 1949

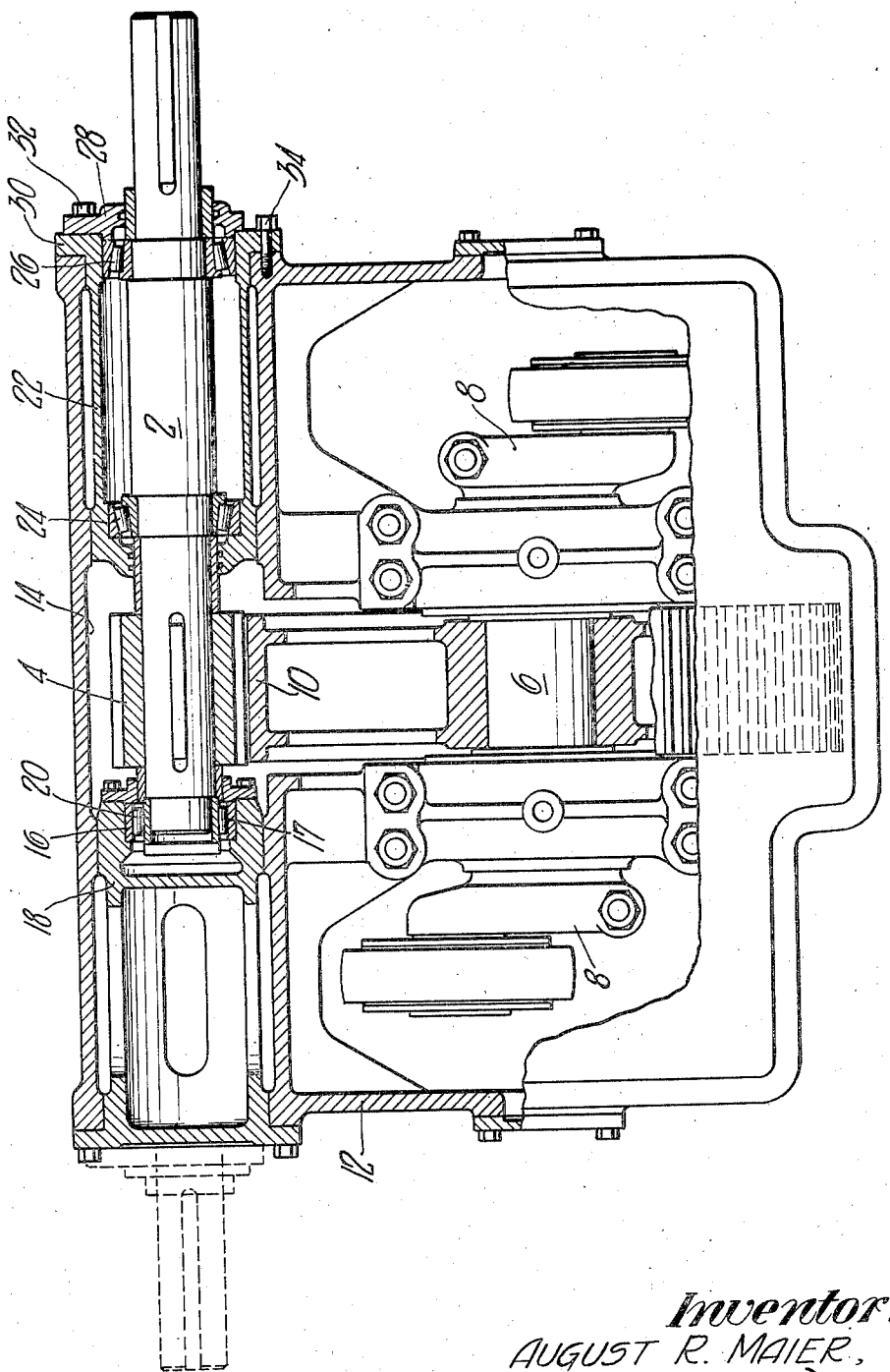

2,458,087

UNITED STATES PATENT OFFICE 2,458,087

DRIVE SHAFT ASSEMBLY

August R. Maier, Oil City, Pa., assignor to Oil Well Supply Company, a corporation of New Jersey Application October 25, 1945, Serial No. 624,370

2 Claims. (Cl. 308—207)

This invention relates to improvements in drive shaft assemblies.

Power slush pumps, such as are used in oil well drilling operations, are designed to be either right or left hand driven, as desired, so that two units can be driven from a single source of power. In order to change the side from which they are driven, it is necessary to reverse the driven or pinion shaft. In previous designs, it has been necessary, after reversing such shaft, to adjust the bearings which involved undesirable delay.

It is accordingly an object of my invention to provide a drive shaft assembly which may be reversed without adjustment of the parts thereof.

It is a further object to provide a drive shaft assembly which is simple in design and rugged and durable in operation.

Additional objects and advantages will become apparent from the following description in conjunction with the accompanying drawing, in which the single figure is a transverse view of a power driving unit partially in elevation and partially in section, showing the improved drive shaft assembly of my invention.

Referring more particularly to the drawing, the numeral 2 designates a drive shaft, which shaft for example, may be associated with a crankshaft mechanism, as shown in the Shimer Patent No. 1,862,807. The drive shaft 2 has a pinion 4 for driving crankshaft 6 and cranks 8 through engagement with crankshaft gear 10.

The crankshaft 6 and cranks 8 are contained in a suitable housing 12, and the drive shaft 2 is enclosed within a compartment 14 on the housing 12. It will be noted that the shaft 2 does not extend entirely across the housing, but is of such length that the pinion 4, which is mounted adjacent the inner end of the shaft, meshes with the crankshaft gear 10. The pinion 4 is somewhat wider than the crankshaft gear 10 so that close adjustment of the shaft 2 and pinion 4, with respect to the gear 10, is not necessary in order to obtain an intermeshing across the full width of the gear 10.

The inner end of the drive shaft 2 is supported by straight rollers 17 in a raceway 16 contained in the inner end of a sleeve 18. The bearing surface 20 of the inner end of the shaft 2 is parallel to the axis of the shaft and somewhat longer than the rollers 17 so that the shaft 2 does not have to be closely adjusted with respect thereto.

The shaft 2 is rotatably mounted in a sleeve 22 by means of opposed tapered roller bearings 24 and 26. Bearing 24 is disposed adjacent the pinion 4 at the inner end of the sleeve and bearing 26 adjacent the outer end of the sleeve and near the end of the shaft. The opposed tapered roller bearings 24 and 26 act as thrust bearings preventing end play of the shaft in either direction. The shaft 2, sleeve 22 and bearings 24 and 26 are held together as a unit by means of a retainer ring 28 secured to a flange 30 on the sleeve by cap screws 32. The shaft assembly is secured to the container 14 by cap screws 34.

From the foregoing, it is seen that the shaft 2 and bearings 24 and 26 are contained as a unit in the sleeve 22. Thus the parts thereof may be assembled and the bearings adjusted by inserting shims, if necessary, between the ring 28 and flange 30. Such assembly and adjustment may be done on a bench outside the frame whereby no further adjustment is necessary after insertion in the frame. Due to the bearing surface 20 being slightly longer than the rollers 17, the pinion 4 likewise slightly wider than the gear 10, the drive may be reversed without any adjustment by withdrawing the shaft assembly and sleeve 18, and inserting them at the opposite end from which withdrawn. Thus the side of drive can be readily changed by simply interchanging the sleeve assemblies without any adjustment of the bearings. Such bearings can be adjusted without having to support the shaft assembly since the shaft is supported by the end members of the assembly. Should the bearings become worn, a spare shaft assembly can replace the worn assembly in a few minutes since all adjustments are made prior to insertion.

While I have shown and described one specific embodiment of my invention, it will be understood that this embodiment is merely for the purpose of illustration and description and that various other forms may be devised within the scope of my invention, as defined in the appended claims.

I claim:

1. In a reversible drive shaft assembly including a housing having opposed openings for a drive, a drive shaft having a pinion which is wider than the gear driven thereby adjacent its inner end, said drive shaft being shorter than the distance between said openings and having its inner end supported in a bearing at the inner end of a sleeve projected through one of said openings, said drive shaft having a bearing surface on its inner end which is longer than the bearing surface of said bearing, said drive shaft being rotatively mounted in a pair of bearings internally disposed adjacent the ends of a sleeve to form a unitary assembly which is projected through the other of said openings whereby said assembly may be reversed by interchanging said sleeves without adjusting said bearings.

2. In a reversible drive shaft assembly including a housing having opposed openings for a drive shaft, a drive shaft having a pinion which is wider than the gear driven thereby adjacent its inner end, said drive shaft being shorter than the distance between said openings and having its inner end supported in a bearing at the inner end of a sleeve projected through one of said openings, said drive shaft having a bearing surface on its inner end which is parallel to the axis of said shaft and longer than the bearing surface of said bearing, said drive shaft being rotatively mounted in a pair of opposed tapered roller bearings internally disposed adjacent the ends of a sleeve to form a unitary assembly which is projected through the other of said openings whereby said assembly may be reversed by interchanging said sleeves without adjusting said bearings.

AUGUST R. MAIER.

REFERENCES CITED

The following references are of record in the file of this patent:

UNITED STATES PATENTS

| Number | Name | Date |
|---|---|---|
| 1,843,875 | Kendall et al. | Feb. 2, 1932 |
| 1,862,807 | Shimer | June 14, 1932 |
| 2,040,793 | Peterman | May 12, 1936 |

Certificate of Correction

Patent No. 2,458,087.  January 4, 1949.

AUGUST R. MAIER

It is hereby certified that errors appear in the printed specification of the above numbered patent requiring correction as follows:

Column 2, line 19, after the numeral and comma "17," insert *and*; line 43, claim 1, after the word "drive" first occurrence and before the comma insert *shaft*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*